United States Patent
Alam et al.

[11] Patent Number: 6,146,484
[45] Date of Patent: Nov. 14, 2000

[54] CONTINUOUS HONEYCOMB LAY-UP PROCESS

[75] Inventors: Shahriar Alam, Chandler; Rodolfo E. Diaz, Phoenix, both of Ariz.

[73] Assignee: Northrop Grumman Corporation, Los Angeles, Calif.

[21] Appl. No.: 09/082,768

[22] Filed: May 21, 1998

[51] Int. Cl.[7] .................................................. B32B 3/12
[52] U.S. Cl. ......................... 156/197; 156/291; 156/292; 156/553; 156/582
[58] Field of Search .................................. 156/197, 290, 156/291, 292, 553, 555, 582

[56] References Cited

U.S. PATENT DOCUMENTS

| Re. 26,444 | 8/1968 | Paige | 156/197 |
|---|---|---|---|
| 2,992,673 | 7/1961 | Bishop | 154/1.6 |
| 3,011,672 | 12/1961 | Vesak | 217/30 |
| 3,035,952 | 5/1962 | Gwynne | 156/512 |
| 3,066,722 | 12/1962 | Adams et al. | 156/470 |
| 3,077,223 | 2/1963 | Hartsell et al. | 156/548 |
| 3,114,666 | 12/1963 | Johnson | 156/197 |

(List continued on next page.)

FOREIGN PATENT DOCUMENTS 1196362  7/1965  Germany ................................ 264/286

*Primary Examiner*—Michael W. Ball
*Assistant Examiner*—Barbara J. Musser
*Attorney, Agent, or Firm*—Terry J. Anderson; Karl J. Hoch, Jr.

[57] ABSTRACT

A method of constructing a honeycomb structure generally undetectable by radar. The method includes winding first and second sheets of radar absorbent material onto a central roller. A first printer prints a plurality of parallel adhesive linear deposits on the first sheet of material as it passes across the first printer. A second printer prints a plurality of parallel adhesive linear deposits on the second sheet of material as it passes across the second printer. The first and second linear deposits are offset with respect to each other. The first and second sheet materials overlap one another during winding onto the central roller. Once the first and second sheets are overlapped onto one another, the adhesive deposits secure sheets together to form a non-expanded honeycomb structure. The non-expanded honeycomb structure is removed from the central roller and is expanded to form the expanded honeycomb structure.

12 Claims, 1 Drawing Sheet

U.S. PATENT DOCUMENTS

| | | | |
|---|---|---|---|
| 3,218,217 | 11/1965 | Geschwender | 156/197 |
| 3,235,431 | 2/1966 | Paige | 156/197 |
| 3,356,555 | 12/1967 | Jackson | 156/205 |
| 3,598,676 | 8/1971 | Noble | 156/205 |
| 3,637,448 | 1/1972 | Siegal et al. | 156/197 |
| 4,205,118 | 5/1980 | Schubert | 428/594 |
| 4,249,974 | 2/1981 | Wilson | 156/85 |
| 4,255,752 | 3/1981 | Noble et al. | 343/771 |
| 4,353,355 | 10/1982 | Stewart | 126/445 |
| 4,353,769 | 10/1982 | Lee | 156/299 |
| 4,415,342 | 11/1983 | Foss | 55/96 |
| 4,500,380 | 2/1985 | Bova | 156/197 |
| 4,598,449 | 7/1986 | Monhardt et al. | 29/157 |
| 4,617,072 | 10/1986 | Merz | 156/89 |
| 4,680,220 | 7/1987 | Johnson | 428/241 |
| 4,720,713 | 1/1988 | Chang et al. | 343/912 |
| 4,816,097 | 3/1989 | Williams et al. | 156/247 |
| 4,824,711 | 4/1989 | Cagliostro et al. | 428/116 |
| 4,861,404 | 8/1989 | Neff | 156/204 |
| 4,948,445 | 8/1990 | Hees | 156/196 |
| 4,956,393 | 9/1990 | Boyd et al. | 521/54 |
| 4,957,883 | 9/1990 | Kobayashi et al. | 501/35 |
| 4,966,611 | 10/1990 | Schumacher et al. | 55/20 |
| 4,981,744 | 1/1991 | Swank | 156/197 |
| 5,078,818 | 1/1992 | Han et al. | 156/89 |
| 5,079,064 | 1/1992 | Forsythe | 428/131 |
| 5,089,455 | 2/1992 | Ketcham et al. | 501/104 |
| 5,102,727 | 4/1992 | Pittman et al. | 428/259 |
| 5,134,421 | 7/1992 | Boyd et al. | 343/872 |
| 5,167,870 | 12/1992 | Boyd et al. | 525/540 |
| 5,188,779 | 2/1993 | Horikawa et al. | 264/62 |
| 5,198,282 | 3/1993 | Baker et al. | 428/114 |
| 5,217,556 | 6/1993 | Fell | 156/205 |
| 5,231,059 | 7/1993 | Leung et al. | 501/12 |
| 5,288,537 | 2/1994 | Corden | 428/116 |
| 5,298,314 | 3/1994 | Even et al. | 428/245 |
| 5,312,511 | 5/1994 | Fell | 156/469 |
| 5,322,725 | 6/1994 | Ackerman et al. | 428/137 |
| 5,344,685 | 9/1994 | Cassell | 428/66 |
| 5,451,444 | 9/1995 | Deliso et al. | 428/116 |
| 5,637,175 | 6/1997 | Feygin et al. | 156/264 |
| 5,792,295 | 8/1998 | Huebner et al. | 156/197 |

CONTINUOUS HONEYCOMB LAY-UP PROCESS

FIELD OF THE INVENTION

This present invention relates generally to the art of honeycomb fabrication and more particularly to a novel process for producing a honeycomb structure formed from sheets of radar absorbing material.

BACKGROUND OF THE INVENTION

The use of honeycomb structures in commercial and military applications is well known. Various industrial applications require structural materials which are capable of extended use and have a high specific strength, that is high strength to weight ratios. One class of such material is honeycomb. These structures can be compositionally and geometrically tailored to exhibit controlled mechanical, electrical, and chemical properties useful in the commercial sector and military sector, such as a material to be sandwiched between two sheets of material.

Previous attempts to fabricate variable shaped honeycomb structures from sheets of radar absorbent material suffer from labor intensive and time consuming operations. Currently radar absorbent material sheets are cut in a length dimension and manually placed on a lay-up table. Each consecutive sheet is placed manually half a pitch width apart such that sheets alternate the nodeline position through the stack which is the width direction of the honeycomb before expansion. This is an extremely tedious task and prone to eye fatigue and operator error. Errors in alignment of the sheets not only cause poor cell configuration but also has a significant impact on block electrical as well as mechanical properties. Automation of this tedious layup process can significantly impact the cost and quality of honeycomb structures and eliminate a bottleneck from the manufacturing process.

It is, therefore, evident that there exists a need in the art for a low cost method of producing a variable shaped honeycomb structure formed from sheets of radar absorbent material.

SUMMARY OF THE INVENTION

The present invention specifically addresses and alleviates the above-mentioned deficiencies associated with the prior art. In accordance with the present invention, there is provided a method of constructing a honeycomb structure generally undetectable by radar. The method includes winding first and second sheets of radar absorbent material onto a central roller. A first printer prints a plurality of parallel adhesive linear deposits on the first sheet of material as it passes across the first printer. A second printer prints a plurality of parallel adhesive linear deposits on the second sheet of material as it passes across the second printer. The first and second linear deposits are offset with respect to each other. The first and second sheet materials overlap one another during winding onto the central roller. Once the first and second sheets are overlapped onto one another, the adhesive deposits secure sheets together to form a non-expanded honeycomb structure. The non-expanded honeycomb structure is removed from the central roller and is expanded to form the expanded honeycomb structure.

BRIEF DESCRIPTION OF THE DRAWINGS

These as well as other features of the present invention, will become more apparent upon reference to the drawings wherein.

DETAILED DESCRIPTION OF THE PREFERRED EMBODIMENT

Figure 1:
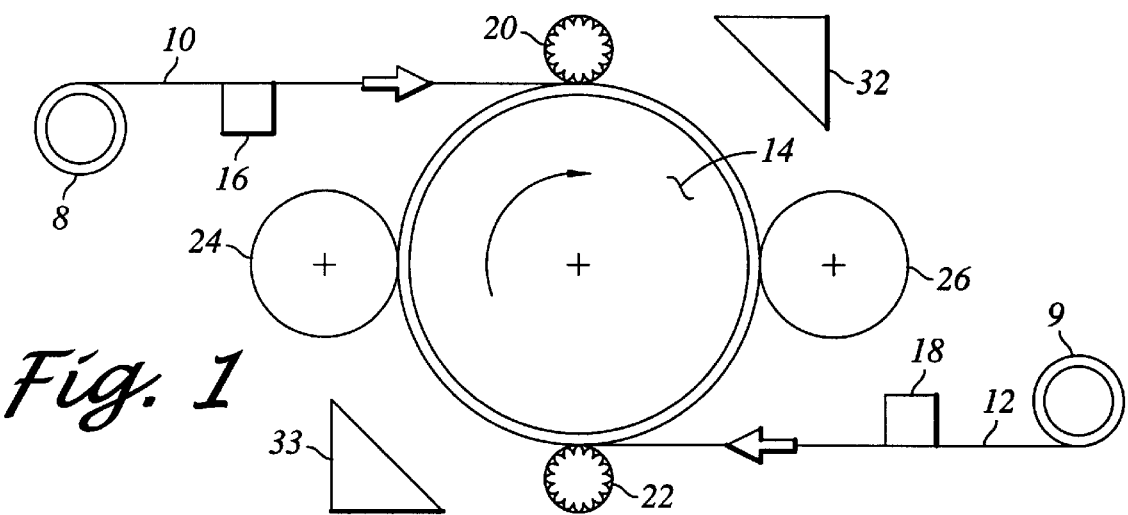
FIG. 1 is a schematic side elevational view of apparatus for constructing a honeycomb structure.

Referring now to the drawings, wherein the figures are for purposes of illustrating the preferred embodiment of the present invention. Referring now to FIGS. 1–4, in accordance with the present invention, there is provided a method for constructing a honeycomb structure FIG. 4 generally undetectable by radar. The method includes placing a first 8 and second 9 roll of radar absorbent sheet material 10 and 12 on opposing sides of a rotatable central roller 14. The rolls 8 and 9 of sheet material 10 and 12 to be fed onto the central roller 14 may consist of radar absorbent nomex, resin pre-impregnated material including low-temperature fusible thermo-plastic material, carbon, carbon fiber, as well as any other electric and magnetic filled absorbing and/or dissipating materials. The central roller 14 is equipped with a variable speed control which determines the rate of production. The central roller 14 can vary in size and shape to form a predetermined configuration of wound sheets of material 34.

The first printer 16 is spatially arranged with the first roll 8 to print a plurality of parallel adhesive linear deposits 17 on the first sheet of material 10 as the first sheet of material 10 passes across the first printer 16. Printing can be achieved with a variety of printing processes including rotogravure, flexographic, rotary screen, or ink jet. The adhesive deposits 17 and 19 on sheet materials 10 and 12 are adjustable, so as to form continuous adhesive deposits 17 and 19 or spaced apart points of adhesive deposits 17 and 19. The adhesive deposits 17 and 19 may consist of a heat curable resin composite material with bond fibers embedded therein. As one in the art would appreciate, an alternative room temperature curable adhesive may be used.

The second printer 18 is spatially arranged with the second roll 9 of sheet material 12 and has the same printing characteristics as first printer 16. The second printer 18 distributes adhesive deposits 19 onto the second sheet material 12 in parallel relation to the first printer 16 adhesive deposits 17. However, the adhesive deposits 19 printed on the second sheet material 12 are not to be in line with adhesive deposits 17 printed on the first sheet material 10. Adhesive deposits 17 and 19 serve to secure first 10 and second sheet materials 12 together along the spaced apart longitudinally extending adhesive deposits 17 and 19. The first printer 16 and second printer 18 shall apply substantially plurality of parallel adhesive linear deposits 17 and 19 on sheet materials 10 and 12 prior to winding onto the central roller 14. Adhesive deposits 17 and 19 are alternately staggered from sheet material 10 to sheet material 12 to insure proper honeycomb cell configuration during expansion of wound sheet materials 10 and 12 after they are removed from central roller 14.

Sheet material 10 and sheet material 12 .are passed substantially simultaneously across respective first printer 16 and second printer 18 to print adhesive deposits 17 and 19 on sheet materials 10 and 12 prior to winding onto the central roller 14. Sheet materials 10 and 12 are substantially simultaneously fed and wound onto central roller 14. Sheet materials 10 and 12 overlap one another during winding onto central roller 14.

Once sheet materials 10 and 12 have overlapped one another, they are tacked together by applying heat and pressure with heated tacking rollers 20 and 22. The tacking rollers 20 and 22 apply heat and pressure to sheet materials 10 and 12 substantially along points of adhesive deposits 17 and 19. The heated tacking rollers 20 and 22 apply heat and pressure to the opposite side to where the adhesive deposits 17 and 19 are located. Tacking sheet materials 10 and 12 together simultaneously during winding insures that the sheet materials 10 and 12 do not unwind and that adhesive deposits 17 and 19 maintain proper alignment with respect to one another. Applying heat and pressure to the adhesive deposits 17 and 19 cures the adhesive deposits 17 and 19 and fixes sheet materials 10 and 12 location with respect to one another.

Once sheet materials 10 and 12 have been overlapped onto one another and tacked together, heat and pressure is applied during winding by passing sheet materials 10 and 12 against a heated grooved nodeline rollers 24 and 26. Nodeline roller 24 contacts sheet material 10 and nodeline roller 26 contacts sheet material 12. The heated grooved nodeline roller 24 and 26 perform two functions. First of all nodeline rollers 24 and 26 cure the adhesive deposits 17 and 19 by applying heat and pressure to sheet materials 10 and 12. Secondly, nodeline rollers 24 and 26 create nodelines 28 (FIG. 4) into each sheet materials 10 and 12 by applying heat and pressure to sheet materials 10 and 12. The heated grooved nodeline rollers 24 and 26 apply heat and pressure to sheets 10 and 12 substantially along adhesive deposits 17 and 19. The heated nodeline rollers 24 and 26 apply heat and pressure to the opposite side to where the adhesive deposits 17 and 19 are located on sheet materials 10 and 12. The nodelines 28 (FIG. 4) determine the honeycomb cell shape and configuration during expansion of the wound sheets of material 34.

In addition, the present invention includes the use of infrared heat sources 32 and 33 to further aid in curing deposits 17 and 19 during winding. Once sheet materials 10 and 12 have been wound onto the central roller 14, the sheet materials 10 and 12 pass infrared heat sources 32 and 33 adjacent the central roller 14. Infrared heating sources insure proper curing of adhesive deposits 17 and 19, and bonding of sheet materials 10 and 12 to one another. Advantageously, the infrared heat sources 32 and 33 reduce time necessary in curing adhesive deposits 17 and 19 resulting in an enhanced production cycle.

Figure 2:
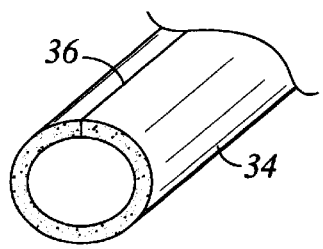
FIG. 2 is a perspective view of a roll of cut non-expanded honeycomb.
Figure 3:
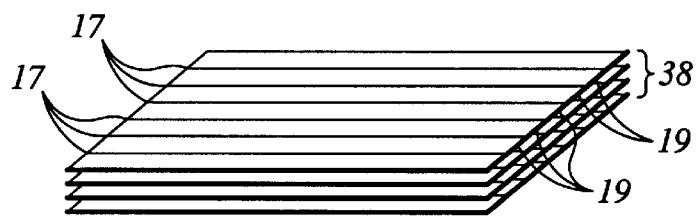
FIG. 3 is a perspective view of the flattened unexpanded honeycomb.
Figure 4:
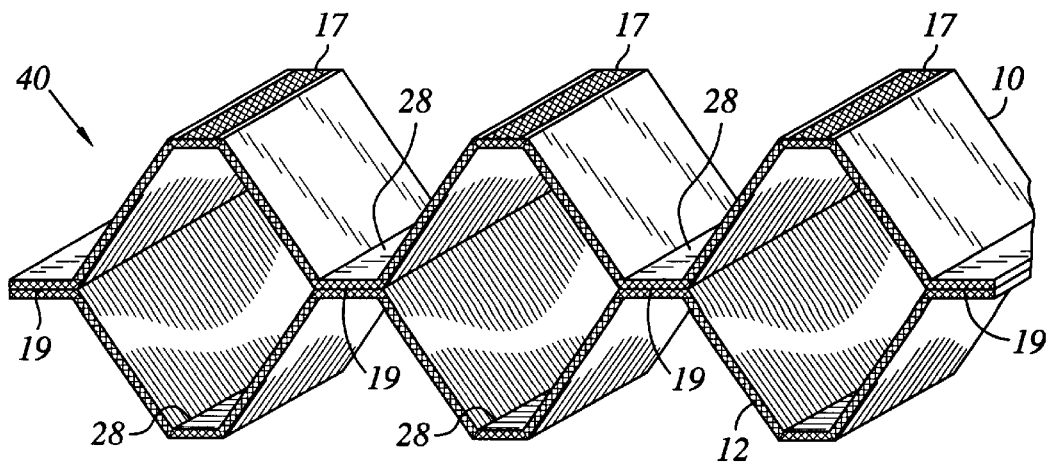
FIG. 4 is a perspective portion view of the expanded honeycomb.

After sheet materials 10 and 12 have been wound to a predetermined thickness or diameter (FIG. 2) and adhesive deposits 17 and 19 are fully cured or partially cured, sheet materials 10 and 12 form a non-expanded honeycomb structure 34. The non-unexpanded honeycomb structure 34 is then removed from the rotatable central roller 14. The unexpanded honeycomb structure 34 is first cut 36 through one full thickness of sheet materials 10 and 12 and removed from central roller 14. The cut unexpanded honeycomb (FIG. 2) is then formed or flattened to produce a rectangular or other predetermined shape of unexpanded honeycomb 38 (FIG. 3). As stated above, the variable shape of central roller 14 determines the shape of unexpanded honeycomb (FIG. 2). The unexpanded honeycomb (FIG. 2) is then expanded to form a honeycomb structure (FIG. 4).

This unique method allows variable honeycomb structural shapes with little or no alterations to the shape once expanded. An elliptical or radius shaped honeycomb structure can be used for structural components such as core to fill curved wing leading edge sections of an aircraft. As one in the art will appreciate, producing variable shaped honeycomb structures enhances production time and minimizes material waist.

Advantageously, in terms of labor costs and production efficiency and time, in order to practice the present invention, a composite honeycomb fabrication worker need only spend a comparable amount of time removing and inserting sheet materials 10 and 12 to be wound onto the central roller 14, as would be needed with regard to conventional manual hand layup.

Accordingly, the present invention represents a significant advance in the art.

What is claimed is:

1. A method for constructing a honeycomb structure generally undetectable by radar, the method comprising:

a) placing a first roll of radar absorbing first sheet material and a second roll of radar absorbing second sheet material opposite each other on opposing sides of a rotatable central roller such that the first and second sheet material can be fed to the roller and wound thereon;

b) spatially arranging a first printer with the first roll to print a plurality of parallel adhesive linear deposits on the first sheet material as said first sheet material passes across said first printer;

c) spatially arranging a second printer with the second roll to print a plurality of parallel adhesive linear deposits on the second sheet material as said second sheet material passes across said second printer, with the proviso that the parallel adhesive deposits printed on the second sheet material not be in line with the parallel adhesive deposits printed on the first sheet material when sheet material from each roll is fed to the central roller and wound thereon;

d) substantially simultaneously passing the first and second sheet materials across respective first and second printers to thereby print adhesive on each first and second sheet;

e) substantially simultaneously feeding said first and second sheets to the central roller for overlapping winding thereon over a plurality of revolutions of said central roller to thereby form a non-expanded honeycomb structure;

f) positioning heated tacking rollers against said overlapping sheet materials for applying adhesive-curing heat and pressure to said sheet materials behind a plurality of points of adhesive deposit to thereby tack said overlapping sheet materials to each other prior to completion of a first revolution of said central roller;

g) positioning heated grooved node line rollers against said overlapping sheet materials for applying adhesive-curing heat and pressure on said overlapping sheet materials and for creating node lines in the sheet materials prior to completion of a first revolution of said central roller to thereby determine honeycomb cell shape and configuration during expansion of the non-expanded honeycomb structure; and h) removing the non-expanded honeycomb structure from the central roller and thereafter expanding said structure.

2. The method as recited in claim 1 wherein the radar absorbent material is chosen from the group consisting of carbon, carbon fiber, as well as any other electric and magnetic filled absorbing and/or dissipating materials.

3. The method of claim 1 wherein the use of a rotatable roller which is variable in size and shape to form a predetermined shaped roll of unexpanded honeycomb.

4. The method as recited in claim 1 wherein the depositing of adhesive is achieved by rotogravure, flexographic, rotary screen, or ink jet printing.

5. The method as recited in claim 1 step (b) wherein the adhesive linear deposits can be deposited as continuous linear deposits, spaced apart points, or dots of adhesive deposits on first and second sheets of radar absorbent material as the sheets pass across the first and second printers.

6. The method as recited in claim 1 wherein the adhesive comprises a heat curable material or a room temperature curable material.

7. The method as recited in claim 1 wherein the adhesive linear deposits are applied substantially equally spaced apart on the first sheet material as the first sheet material passes across the first printer.

8. The method as recited in claim 7 wherein the second printer is moved such that the parallel adhesive deposits printed on the second sheet material are in a parallel equally spaced apart of offset relationship to the parallel adhesive linear deposits printed on the first sheet material prior to the winding onto the central roller.

9. The method as recited in claim 2 wherein overlapping of first and second sheets onto the central roller further comprises the use of an infrared heating source to further aid in curing adhesive deposits.

10. The method as recited in claim 1 wherein removing the non-expanded honeycomb structure further comprises cutting the structure through at least one full thickness of overlapped radar absorbent first and second sheet materials.

11. The method as recited in claim 10 wherein the cut honeycomb structure is removed from the central roller and formed into a predetermined configuration of unexpanded honeycomb.

12. The method as recited in claim 11 wherein the formed unexpanded honeycomb is expanded to produce a honeycomb structure.

\* \* \* \* \*